United States Patent Office 3,835,095
Patented Sept. 10, 1974

3,835,095
STABILIZATION OF ORGANIC SUBSTANCES THAT ARE LIABLE TO PEROXIDIC DECOMPOSITION
Cornelis R. H. I. de Jonge, De Steege, William J. Mijs, Rozendaal, and Hendrik J. Hageman, Dieren, Netherlands, assignors to Akzo N.V., Arnhem, Netherlands
No Drawing. Filed Feb. 7, 1972, Ser. No. 224,287
Claims priority, application Netherlands, Feb. 15, 1971, 7102009
Int. Cl. C08f 45/58
U.S. Cl. 260—45.85 S    9 Claims

ABSTRACT OF THE DISCLOSURE

An improvement in the stabilization of organic substances that are liable to peroxidic decomposition wherein a 2,4,6-trisubstituted phenol is used as the stabilizer. The stabilizer is an o-phenylphenol which has a substituted or non-substituted alkyl-, aralkyl-, alkoxy- or aralkoxy group in the p-position or is in this position bonded to a like radical by means of an alkylidene group, an alkylidene dioxy group or a sulfur atom and has an isopropyl, tert.-butyl, cyclohexyl or phenyl group in the other o-position or is in this position bonded by an alkylidene group or a sulfur atom to a like radical to form a 2,2'-alkylidene bis (6-phenylphenol) or a 2,2'-thiobis(6-phenylphenol).

---

This invention relates to stabilized compositions comprising one or more organic compounds that are liable to peroxidic decomposition and to their preparation.

Compositions stabilized with substituted phenols are known in the art and described in the French Patent Specification No. 1,387,778.

A phenol-based antioxidant known therefrom is 2,6-ditert.-butyl-4-methoxyphenol. Said compound may be included in a great many foodstuffs for the purpose of improving the keeping properties and preserving the taste and the nutritional value. It may also be included in cattle food, cosmetics, vitamin preparations and synthetic materials such as polyolefines and polyester resins.

To prevent the quality of the products to be treated from being impaired it is preferred that use should be made of stabilizers which can be employed in smaller amounts and yet exhibit the same activity when included in substances that are liable to peroxidic decomposition.

Broadly, this invention relates to a composition comprising at least one organic compound liable to peroxidic decomposition, and a stabilizing amount of a 2,4,6-trisubstituted phenol which has a phenyl group in the o-position and a substituted or non-substituted alkyl-, aralkyl-, alkoxy- or aralkoxy group in the p-position or is in this position bonded to a like radical by means of an alkylidene group, an alkylidene dioxy group or a sulfur atom and has an isopropyl, tert.-butyl, cyclohexyl or phenyl group in the other o-position or is in this position bonded by an alkylidene group or a sulfur atom to a like radical to form a 2,2'- alkylidene bis(6-phenylphenol) or a 2,2'-thiobis(6-phenylphenol).

Exemplary stabilizing compounds are:

4-benzoxy-2,6-diphenylphenol;
4-methyl-2,6-diphenylphenol;
2,6-diphenyl-4-propoxyphenol;
2-tert.-butyl-4-methyl-6-phenylphenol;
2-tert.-butyl-4-decanoxy-6-phenylphenol;
2-tert.-butyl-4-methoxy-6-phenylphenol;
4-(2-ethylhexanoxy)-2,6-diphenylphenol;
2-isopropyl-4-methoxy-6-phenylphenol;
2-cyclohexyl-4-methyl-6-phenylphenol;
2,2'-methylene-bis(4-methyl-6-phenylphenol);
4,4'-decamethylenedioxy-bis(2-tert.-butyl-6-phenylphenol);
4,4'-butylidene-bis(2-tert.-butyl-6-phenylphenol);
4,4'-thiobis(2,6-diphenylphenol).

As appears from these examples the groups in the p-position may be relatively small or large.

The former case is preferred if a compound having a maximum activity per unit weight is required. Moreover, the synthesis of low-molecular compounds generally proceeds more readily.

As examples may be mentioned:
4 - methoxy-2,6-diphenylphenol, 4-ethoxy-2,6-diphenylphenol, and 2-tert.-butyl-4-methoxy-6-phenylphenol.

The preparation of the former product may be carried out by dissolving, 2,6-diphenylhydroquinone in boiling methanol to which $H_2SO_4$ is added.

The synthesis of 2-tert.-butyl-4-methoxy-6-phenylphenol may be effected by causing o-phenylphenol to react with isobutylene in the presence of a catalytic amount of aluminium, as a result of which 2-tert.-butyl-6-phenylphenol is obtained, which is oxidized to quinone and after reduction dissolved in boiling methanol to which $H_2SO_4$ is added.

The oxidation to quinone may be carried out in the presence of bis(salicylidene)ethylene diimino cobalt (II) as catalyst. As a solvent mostly chloroform or methanol is used. It has been found that a much higher yield can be obtained if said catalyst is in the form of the dimethyl formamide complex. The results of the experiments using different solvents are shown in Table 1.

TABLE 1

| Phenol | Time (in min.) required for the absorption of half the total amount of $O_2$ taken up | | | Yield of p-benzoquinone (percent) | | |
|---|---|---|---|---|---|---|
| | $CHCl_3$ | $CH_3OH$ | DMF | $CHCl_3$ | $CH_3OH$ | DMF |
| 2,6-dimethoxy | 45 | 5 | 14 | 14 | 56 | 93 |
| 2,6-di-t-butyl | 390 | 35 | 4 | 24 | 80 | 95 |
| 2,6-diphenyl | 690 | 420 | 60 | 26 | 54 | 92 |

Starting with cyclohexene 2-cyclohexyl-4-methoxy-6-phenylphenol may be prepared in the same manner.

The intermediate product 2-isopropyl-6-phenylphenol for the preparation of 2-isopropyl-4-methoxy-6-phenylphenol may be prepared in the same manner as is known in the art for the production of 2,6-diisopropylphenol from 2-isopropylphenol.

Another example of a compound having a very high activity per unit weight is o-phenylphenol, which has a tert.-butyl- or phenyl group in the other o-position and a methyl group in the p-position.

This compound may be synthesized by chloromethylation of a 2,6-disubstituted phenol. Reduction of this chloromethyl compound gives the corresponding methyl compound.

In order to improve the take up of stabilizers according to the invention by the products to be stabilized it may sometimes be of advantage to introduce in the p-position longer branched or non-branched chains which are readily taken up by the products to be stabilized. In order to ensure a maximum activity per unit weight the invention provides a method which uses a compound containing two o-phenylphenol groups which in the p-position are bonded to form a 4,4'-alkylenedioxy-bis-(6-phenylphenol) as a result of etherification with a bifunctional alcohol containing 4 to 20 carbon atoms.

Instead of using aliphatic alcohols, the etherification may be carried out with alcohols having a ring structure, for instance: cycloaliphatic alcohols. The same applies to compounds which have in the p-position a substituted or non-substituted alkyl group or aralkyl group.

Besides, regardless of the product to be stabilized, it may be of advantage to use a stabilizer having a high molecular weight and maximum activity.

To this end the invention provides a method using a compound containing two functional groups which in the o-position are bonded by an alkylidene group to form a 2,2'-alkylidene bis(6-phenylphenol).

As an example may be mentioned 2,2'-methylene-bis-(4-methyl-6-phenylphenol). This substance may be prepared in a simple manner by reacting 4-methyl-6-phenylphenol with formaldehyde in a hydrochloric acid medium. Alternatively, two functional groups may in the p-position be bonded by a substituted or non-substituted alkyl group or aralkyl group to form a 4,4'-(ar)alkylidene-bis-(6-phenylphenol). As an example may be mentioned 4,4'-butylidene-bis-(2-tert.-butyl-6 - phenylphenol). This compound is prepared from 2-tert.-butyl-6-phenylphenol and butyraldehyde. It has been found that a very good stabilizing effect may be obtained by incorporating in the substances to be stabilized sulfur compounds such as 4,4'-thiobis-(2,6-diphenylphenol). They may be prepared in a known manner from $SCl_2$ and 2,6-diphenylphenol.

The alkyl-, aralkyl-, alkoxy-, or aralkoxy group in the p-position may, if desired, be provided with functional groups such as $-NH_2$, $-COOH$, and the like, as a result of which the stabilizer concerned may be incorporated in a particular polymer, or be provided with an $SO_3H$-group so that it may more readily be emulsified in a particular product.

Stabilizers of the type according to the invention are particularly suitable for the stabilization of polyolefines such as polyethylene, polypropylene, polyisobutene, and polyisoprene.

Besides for the stabilization of various types of latex and synthetic rubber, they may very suitably be employed for the stabilization of different types of polymer that are liable to peroxidic decomposition. Examples thereof are polystyrene, polymethacrylate, nylon 6, nylon 66, polyethylene terephthalate, and unsaturated polyester resins.

The stabilizers of the type according to the invention are also suitable for use in the foodstuff and the cosmetics industry.

Moreover, they may be employed for the stabilization of lubricating oils, and solvents such as tri- and perchlorethylene, and they may find application in the paints and lacquers industry.

The amount to be incorporated very much depends on the product to be stabilized.

The stabilization of polyolefines is found to proceed very satisfactorily with the use of an amount as low as of from 0.1 to 5% by weight. Preferably an amount in the range of 0.5 to 2.5% by weight is added.

For the stabilization of liquids the use of even far lower concentrations, of the order of a few ppm, will generally suffice.

The compounds according to the invention may be used alone or in combination with other stabilizers. Thus it is known from British Patent Specification No. 890,468 that a β-thioether of propionic acid or of a propionic acid ester acts in synergism with 2,4,6-trialkyl phenols.

In experiments it has surprisingly been found that this synergistic action may be considerably increased if the 2,4,6-trisubstituted phenol used is a 4-alkoxy-6-phenylphenol according to the invention.

Not only β-thioethers of propionic acid or of propionic acid esters but also any dialkyl thioether with an activated β-hydrogen atom is suitable to be used in synergistic combination.

The results of the experiments are shown in the Tables 2 and 3, the substance to be stabilized being polypropylene in which in all cases 0.2% by weight of antioxidant and 0.5% by weight of a thioether with an activated β-hydrogen atom were introduced.

The experiments were carried out at about 180° C. in accordance with the method described by J. Pospisil et al. in Advances in Chem. Series of the American Chemical Society (1968), pp. 169–201. Most of the experiments were carried out while use was made of dilauryl-thiodipropionate (DLTDP). In the table are the times (in hours) in which 20 ml. of $O_2$ was taken up per gram of polypropylene at at temperature of 180°C.

TABLE 2

| Run | Antioxidant | Without DLTDP | With DLTDP |
|---|---|---|---|
| 1 | | 0.8 | 2.5 |
| 2 | 2,6-di-tert.-butyl-4-methylphenol | 1 | 12 |
| 3 | 2,2'-methylene-bis-(6-tert.-butyl-4-methylphenol) | 9 | 21 |
| 4 | 4,4'-thiobis-(6-tert.-butyl-3-methylphenol) | 10 | 23 |
| 5 | 4-methyl-2,6-diphenylphenol | 1 | 14 |
| 6 | 4-methoxymethyl-2,6-diphenylphenol | 1 | 8 |
| 7 | 4-methoxy-2,6-diphenylphenol | 1 | 32 |
| 8 | 2-tert.-butyl-4-methoxy-6-phenylphenol | 1 | 30 |

The results clearly show that the synergistic combination of DLTDP and 4-methoxy-2,6-diphenylphenol or 2-tert.-butyl-4-methoxy-6-phenylphenol is far more effective than of DLTDP and any of the other compounds included in the table.

Table 3 lists the results of a number of experiments using 4-methoxy-2,6-diphenylphenol and various β,β'-disubstituted diethylthioethers.

TABLE 3

| Synergist $X-CH_2-CH_2-S-CH_2-CH_2-X$ | Time (in hours) |
|---|---|
| $X=-\overset{O}{\underset{\|}{C}}-OC_{12}H_{25}$ | 32 |
| $X=-\overset{O}{\underset{\|}{C}}-O-CH_3$ | 48 |
| X = -phenyl | 57 |
| X = -CN | 47 |
| $X=-\overset{O}{\underset{\|}{C}}-O-C_2H_5$ | 52 |

From the above Tables 2 and 3 it is obvious that the synergistic action is very much increased if according to the invention use is made of a 4-alkoxy-6-phenylphenol. The synergistic action may offer many advantages if the presence of one of the two components in a particular combination is objectionable for instance for toxological or other reasons. It is preferred that the stabilizers should be introduced in practically equal amounts. The minimum amount in which either stabilizer must be present in order to give the desired results is in the range of 0.005 to 2% by weight, the amount in which each component is added usually being in the range of 0.2 to 5% by weight. In this way it is possible to stabilize products with such a small amount of adjuvant as will hardly, if at all, have any effect on the other properties. The invention will be described further in the following examples.

EXAMPLE I

Preparation of 2,6-diphenyl-4-methoxyphenol 30 g. of 2,6-diphenyl hydroquinone obtained by reduction of 2,6-diphenyl benzoquinone—prepared by the method described in Tetrahedron Letter (1970), page 1881 ff.—were dissolved in 300 ml. of methanol at 65° C. To the boiling solution were then added dropwise 75 g. of $H_2SO_4$ (96% by weight) over a period of 4 hours. The mixture was then allowed to react for 24 hours at 65° C. and, after the addition of ice, extracted with chloroform.

The residue obtained after washing with water, drying and evaporation was distilled in vacuo.

The yield was 25.5 g. of 2,6-diphenyl-4-methoxyphenol. At 0.7 mm. Hg the resulting compound was found to have a boiling point of 200° C. and a melting point of 68.3° C. From the table below it can be seen how far the compositions calculated and found by analysis are in agreement with each other.

| Percentage by weight | Calculated | Found |
| --- | --- | --- |
| C | 82.61 | 82.67 |
| H | 5.80 | 5.81 |
| O | 11.59 | |

EXAMPLE II

Preparation of 2,6-diphenyl-4-ethoxyphenol

The preparation took place in the manner described in Example I, except that ethanol was employed instead of methanol.

The melting point of the resulting compound was 90° C.

The table below shows how far the compositions calculated and found by analysis are in agreement with each other.

| Percentage by weight | Calculated | Found |
| --- | --- | --- |
| C | 82.76 | 82.70 |
| H | 6.21 | 6.19 |
| O | 11.03 | |

EXAMPLE III

Preparation of 2,6-diphenyl-4-decanoxyphenol

The preparation took place in the manner described in Example I, except that decanol was employed instead of methanol.

The melting point of the resulting compound was 35.2° C.

The table below shows how far the compositions calculated and found by analysis are in agreement with each other.

| Percentage by weight | Calculated | Found |
| --- | --- | --- |
| C | 83.58 | 83.41 |
| H | 8.46 | 8.58 |
| O | 7.96 | |

EXAMPLE IV

Preparation of 2,6-diphenyl-4-benzoxyphenol

The preparation took place in the manner described in Example I, except that benzyl alcohol was employed instead of methanol.

The product was liquid at room temperature.

Just as for the products obtained in the afore-mentioned examples the structure was confirmed by means of infrared and NMR-spectroscopy.

EXAMPLE V

Preparation of 2,6-diphenyl-4-(2-ethylhexanoxy)phenol

The preparation took place in the manner described in Example I, except that 2-ethylhexanol was employed instead of methanol.

The resulting product was found to be liquid at room temperature.

The structure was confirmed by means of infrared and NMR-spectroscopy.

EXAMPLE VI

In a given amount of non-stabilized polypropylene the following antioxidants were included (0.1 mmole of antioxidant per gram of polypropylene):

1. pyrocatechol
2. 2,6-di-tert.-butyl-4-methoxyphenol
3. 2,6-diphenyl-4-decanoxyphenol
4. 2,6-diphenyl-4-ethoxyphenol
5. 2,6-diphenyl-4-methoxyphenol A control experiment was made using polypropylene to which no stabilizer had been added. The mixture containing the antioxidants 1 and 4 and the control were constantly kept at 150° C. For the polypropylene stabilized with 2,6-diphenyl-4-methoxyphenol it took more than 150 hours to absorb 20 ml. of $O_2$ per gram of polypropylene, whereas for the pyrocatechol-stabilized polypropylene and the control it took only 20 hours and 1 hour, respectively.

Thereupon the mixtures containing the anti-oxidants 2, 3, and 4, as well as the control were heated at 180° C. The times required for absorbing 20 ml. $O_2$/g. polymer were then found to be for

|   | Hours |
| --- | --- |
| The control | 1 |
| The mixture with antioxidant— | |
| 2 | 4 |
| 3 | 11 |
| 4 | 15 |
| 5 | 20 |

The following test method was carried out.

Powdered polymer was mixed with the required amount of antioxidant and homogenized in an inert atmosphere, using a few drops of acetone.

After evaporation in vacuo of the solvent at 40° C. the polymer was introduced into a tube connected with an oxygen-filled gas burette.

After the tube had been placed in a jacket heated at 180° C. the oxygen take-up was measured.

EXAMPLE VII

Preparation of 2-tert.-butyl-4-methoxy-6-phenylphenol

A solution of 22.6 grams of 2-tert.-butyl-6-phenylphenol in 200 ml. of dimethyl formamide was shaken with oxygen at 20° C. in the presence of 2.5% by weight of bis-(salicylidene)ethylenediimino cobalt (II). After the practically quantitative absorption of the oxygen (about two hours) the reaction mixture was poured into 600 ml. of ice/water mixture, followed by adding 10 ml. of concentrated hydrochloric acid. After extraction with ether and washing with water followed by evaporation 23.0 grams of 2-tert.-butyl-6-phenylbenzoquinone were obtained. This product was dissolved in methanol and quantitatively hydrogenated with a Pt/c-catalyst to give 2-tert.-butyl-6-phenylhydroquinone. The melting point of this product was in the range of 100.8 to 101.1° C. The preparation of the 4-methoxy compound was carried out in the same manner as described in Example I.

EXAMPLE VIII

Preparation of 2,6-diphenyl-4-methylphenol 4.5 grams of 4-chloromethyl-2,6-diphenylphenol, obtained by chloromethylation of 2,6-diphenylphenol by the method described in J. Org. Chem. 28, 3486 (1963) for 2,6-di-tert.-butyl-4-chloromethylphenol, were dissolved in 50 ml. of tetrahydrofuran. The resulting solution was added dropwise to a suspension of 2.5 grams of $LiAlH_4$ in 100 ml. of tetrahydrofuran. After standing overnight the excess of $LiAlH_4$ was removed by the addition of a mixture of tetrahydrofuran and water. The reaction mixture was then poured into acidified ice water and extracted with ether. The residue obtained after washing with water, drying, and evaporation was purified by crystallization in chloroform. The melting point of the resulting compound was in the range of 81.2 to 81.6° C. The yield was almost quantitative. The structure of the compound was confirmed by NMR and mass spectroscopy.

EXAMPLE IX

Preparation of 2-tert.-butyl-4-methyl-6-phenylphenol

The preparation of this compound was started from 2-tert.-butyl - 4 - chloromethyl-6-phenylphenol obtained by chloromethylation of 2-tert.-butyl-6-phenylphenol. The synthesis was carried out in the same manner as described in Example VIII. The product was liquid at room temperature. The boiling point was 150° C. at 3.5 mm. Hg. The yield was almost quantitative. The structure was confirmed by NMR and mass spectroscopy.

EXAMPLE X

Preparation of 4-methoxymethyl-2,6-diphenylphenol 4.5 grams of 4-chloromethyl-2,6-diphenylphenol obtained as described in Example VIII were dissolved in excess methanol. After standing for two days at room temperature the solvent was evaporated in vacuo. The residue was recrystallized in methanol. The melting point of the resulting compound was in the range of 119.6 to 120.6° C. The yield was quantitative. The structure was confirmed by NMR and mass spectroscopy.

EXAMPLE XI

Preparation of 2,6-diphenyl-4-ethoxymethylphenol

The preparation took place in the same manner as described in Example X, except that ethanol was employed instead of methanol. The melting point of the compound obtained was in the range of 103 to 104.5° C. The yield was quantitative. The structure was confirmed by NMR and mass spectroscopy.

We claim:

1. A composition comprising an organic compound liable to peroxidic decomposition stabilized by a binary synergistic mixture of:

(a) a 2,4,6-trisubstituted phenol of the formula:

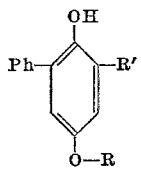

wherein Ph represents a phenyl group; R represents methyl, ethyl, propyl, 2-ethyl hexyl, decyl or benzyl groups, and R' represents an isopropyl, tert-butyl, cyclohexyl or phenyl group, and (b) a dialkylthioether with an activated β-hydrogen atom selected from the group consisting of diethylthiodipropionate, dilauryl thiodipropionate, dimethylthiodipropionate, B,B' - diphenyl diethylthioether, and B,B'-dicyanodiethylthioether, each compound (a) and (b) being present in an amount of 0.005 to 5 weight percent with respect to the total composition.

2. The composition of claim 1 wherein said organic compound is a polyolefin.

3. The composition of claim 1 wherein component (a) is 2,6-diphenyl-4-methoxyphenol.

4. The composition of claim 1 wherein component (a) is 2,6-diphenyl-4-ethoxyphenol.

5. The composition of claim 1 wherein component (b) is a thioether of an ester of propionic acid.

6. The composition of claim 5 wherein said ester is dimethyl- or diethylthiodipropionate.

7. The composition of claim 5 wherein said ester is dilaurylthiodipropionate.

8. The composition of claim 1 wherein component (b) is a 2,2'-dicyanodiethylthioether.

9. The composition of claim 1 wherein component (b) is a 2,2'-diphenyldiethylthioether.

References Cited

UNITED STATES PATENTS

| | | | |
|---|---|---|---|
| 3,378,516 | 4/1968 | Tholstrup et al. | 260—45.85 |
| 3,335,104 | 8/1967 | Kopacki et al. | 260—45.95 |
| 3,075,832 | 1/1963 | Ecke et al. | 260—620 |
| 3,290,392 | 12/1966 | Ecke et al. | 260—619 |
| 3,658,743 | 4/1972 | Bevilacqua | 260—45.95 |
| 2,967,774 | 1/1961 | Bell et al. | 260—613 |
| 3,038,878 | 6/1962 | Bell et al. | 260—613 |
| 3,355,421 | 11/1967 | Cook | 260—45.85 |

V. P. HOKE, Primary Examiner

U.S. Cl. X.R.

99—163; 252—49.6; 106—189; 260—45.95 H, 45.95 C, 45.95 R and G, 609 F, 613 R, 620